Aug. 12, 1952     H. C. PRESTON     2,606,767
VALVE REFACER WORK HEAD

Filed Feb. 6, 1948     4 Sheets-Sheet 1

Inventor
Henry C. Preston
By Thomas W. J. Clark
Attorney

Witness
Porter N. Hautt

Aug. 12, 1952     H. C. PRESTON     2,606,767
VALVE REFACER WORK HEAD

Filed Feb. 6, 1948     4 Sheets-Sheet 4

Inventor
Henry C. Preston

Patented Aug. 12, 1952

2,606,767

UNITED STATES PATENT OFFICE 2,606,767

VALVE REFACER WORK HEAD

Henry C. Preston, Towson, Md., assignor to The Black & Decker Manufacturing Company, a corporation of Maryland Application February 6, 1948, Serial No. 6,745

11 Claims. (Cl. 279—4)

This invention relates to a quick acting chuck which was developed for use on a valve refacer.

The chuck on these refacers has usually been tightened upon the work or spindle of the valve by means of a hand wheel operated screw, and an object of the present invention is to speed up this action of closing the chuck, to close it by compressed air and to allow for its release by simply releasing the air formerly introduced into the chuck. Another object of the invention is to provide a work holding spindle which is self-centering and which maintains its axial alignment substantially over the life of the chuck.

Another object of the invention is to make an air chuck which may be quickly converted to a hand wheel and screw operated chuck. Another object of the invention is to make a chuck in which the collet of the chuck is readily interchangeable so that different sized stems may be gripped firmly. Among the other objects of the invention are to make a chuck which will hold its lubricant for a long period of time, to provide the air chuck with a piston which does not rotate with the spindle, to leave a cylindrical opening through the spindle so that a gauge rod may be used to contact the stem of the valve and to resiliently drive the spindle of the chuck.

Other objects and advantages of the chuck of this invention will be apparent from the following description and the accompanying drawings in which.

Similar numerals refer to similar parts throughout the several views.

Figure 1:
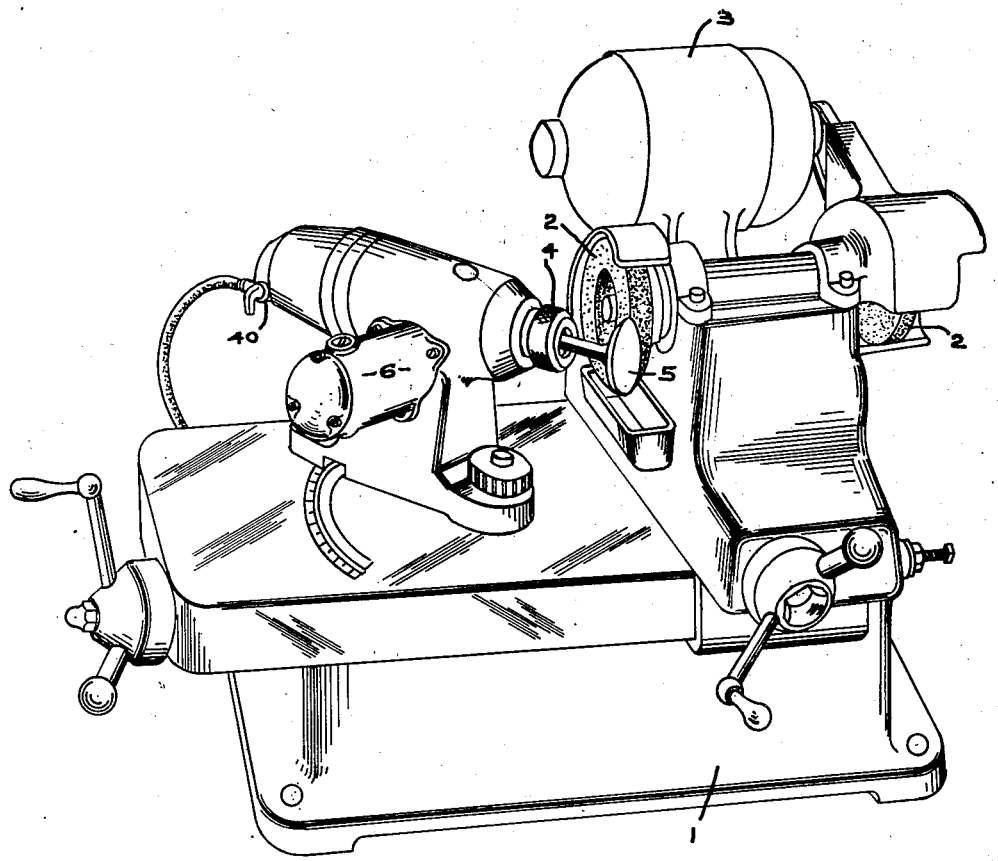
Figure 1 is a perspective view of a valve grinding machine showing the chuck in work holding position.

The grinding machine 1 has grinding wheels 2 driven by motor 3 and a work holding chuck generally designated 4, shown in this instance as holding the stem of a valve 5 being refaced by one of the wheels 2.

Figure 2:
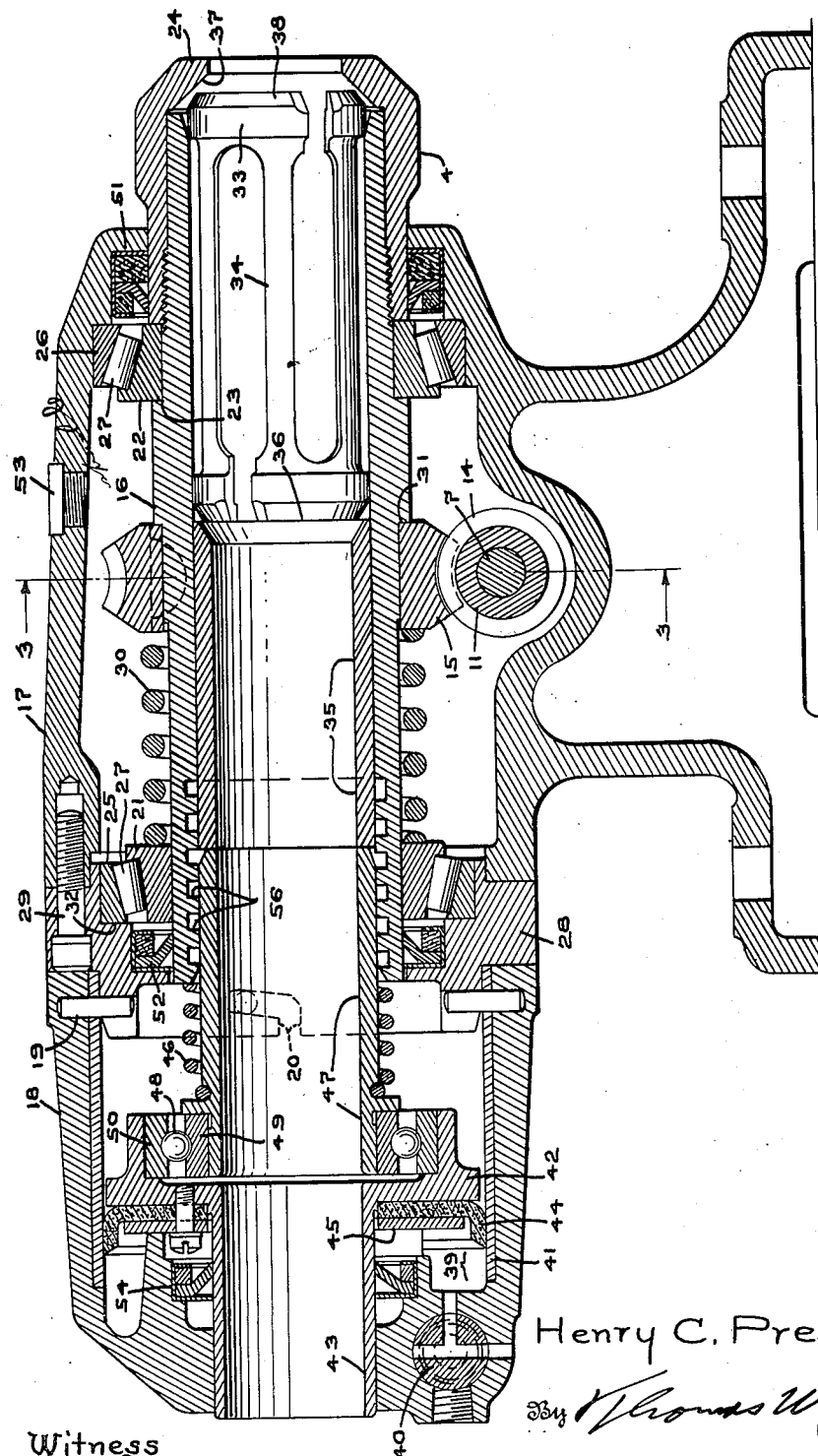
Figure 2 is a vertical longitudinal sectional view of the chuck.
Figure 3:
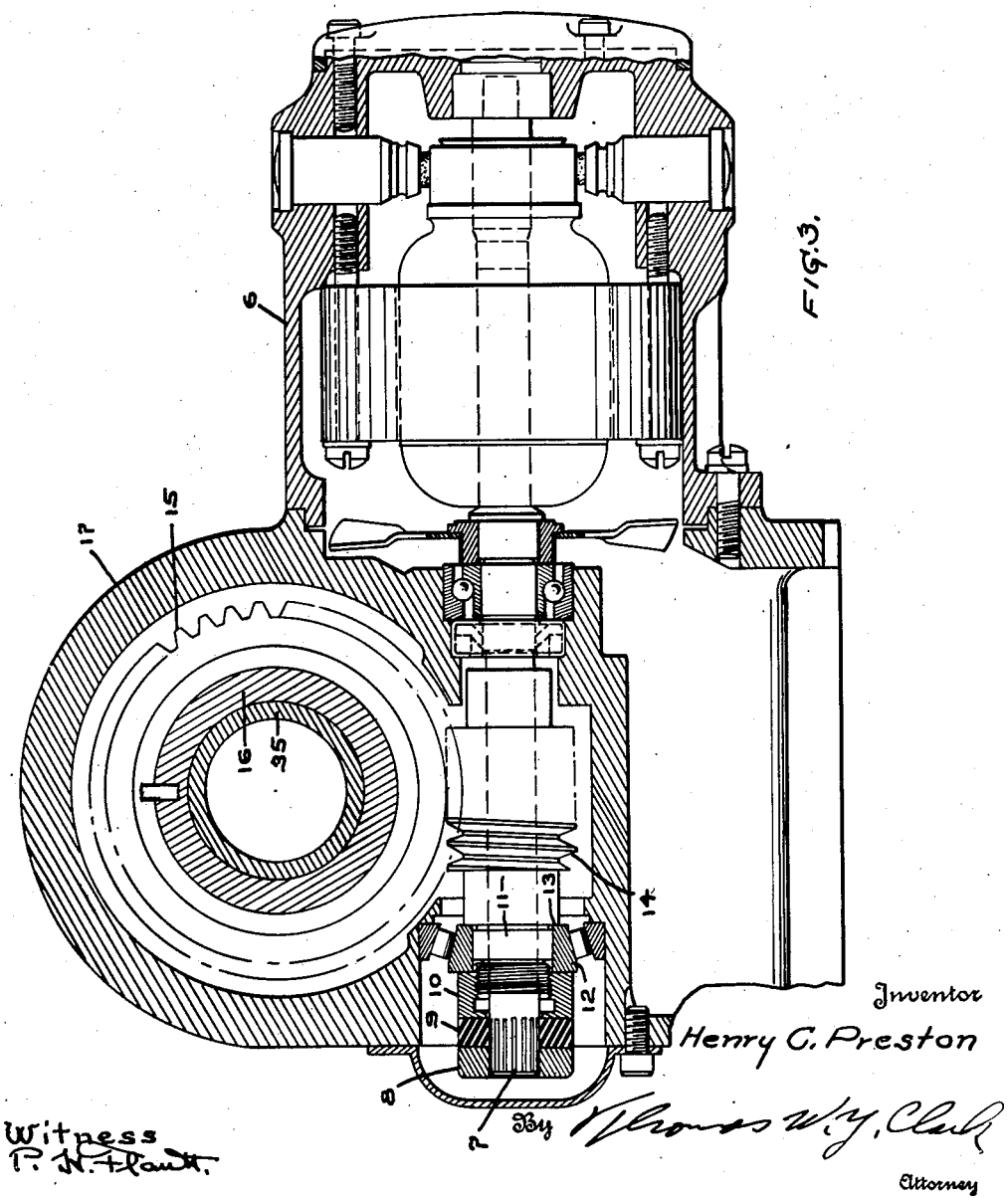
Figure 3 is a transverse sectional view on line 3—3 of Figure 2.

The chuck 4 is driven by a separate motor 6 by means of the motor shaft 7 to which is fixedly engaged ring 8, the ring being vulcanized to the rubber driving connection 9 which is in turn vulcanized to nut 10 which is screwed tightly on spindle 11 against bearing 12 which in turn bears against shoulder 13 on the spindle 11, which, except for the rubber connection 9 would freely rotate on motor shaft 7. Worm 14 of spindle 11 drives worm gear 15 keyed to spindle 16 as shown in Figure 2.

The chuck 4 is enclosed in a main housing 17 and a rear cap 18 which is attached to the main housing 17 by means of pins 19 fitting in the bayonet slots 20 on the rear of the main housing 17.

The spindle 16 has thereon conical bearing rings 21 and 22 which are conically inclined away from one another. Ring 22 rests against shoulder 23. It is pushed against this shoulder by means of collet chuck 24 surrounding the forward end of spindle 16 and screwed tightly thereto. The housing 17 has corresponding bearing rings 25 and 26 therein and conical rolls 27 complete the bearings for the support of the spindle 16 in the housing 17.

An adapter ring 28 actually carries the bearing ring 25 and the adapter ring is held fast to the housing 17 by means of screws 29, the adapter ring thus forming the rear end of the main housing 17.

Ring 21 slides freely on spindle 16 and the spindle 16 slides outwardly against the conical bearing surface of ring 26, being restrained in this latter motion by bearings 27 and ring 22 held against shoulder 23. Compression spring 30 bears against gear 15 to hold it against shoulder 31 on spindle 16 and presses ring 21 to the rear against bearings 27 and ring 25, pressing against shoulder 32 in adapter ring 28. Because of this conical construction of the bearing rings, away from one another, and the transverse sliding action of one of them, on the spindle, being pressed outwardly on the spindle and pushing the spindle outwardly in the other direction, the spindle is centered axially and it maintains that centering even with wear of the bearings and their rings.

Within the spindle 16 is a collet 33, split at both ends and having resilient connecting ribs 34 and a collet sleeve 35 having a flaring end co-acting with tapered end 36 on one end of the collet, and a conical surface 37 in the collet chuck 24 cooperates with collet taper 38, so that when the collet sleeve 35 is pressed forwardly the collet firmly grips the stem of the valve 5.

The cap 18 on the rear of the housing 17 forms an air cylinder 39 having a valve 40 therein through which compressed air may be admitted to or emitted from the cylinder or chamber 39 simply by turning the valve. The air cylinder 39 has a lining 41, a piston 42 with a tubular stem 43, sliding closely in a rear opening in cap 18, the piston also has a packing 44 held tightly against the piston by a washer 45, and the piston slides longitudinally in the air cylinder or chamber 39 in response to the admission of air on one side and in response to the spring 46 on the other side. This spring 46 surrounds plunger 47 which slides in and rotates with spindle 16 and pushes collet sleeve 35 outwardly in its forward movement. The spring 46, at its rear, fits in a groove in the plunger 47, so as to be held thereon. The plunger 47 is connected with piston 42 to allow a relative rotation of these parts through means of ball bearings 48 between ring 49 on the plunger and ring 50 in the piston. Grease packing holders 51 and 52 hold the grease in the bearings for spindle 16 and for its drive shaft, which grease may be placed within the chamber through plug opening 53; a packing holder 54 also closely surrounds the tubular stem 43 of piston 42.

The admission of air through valve 46 forces the piston 42 forward, which in turn forces the plunger 47 forward against the collet sleeve 35 to lock the collet upon the stem of the work piece. Turning the valve the other way releases the air pressure and allows the spring 46 to withdraw the plunger 47 and the collet because of its resilient construction opens and pushes back the collet sleeve 35 and thereby releases the work piece.

If desired the cap 18 with its piston and connected parts may be removed and a different sized collet readily inserted.

Figures 4, 5:
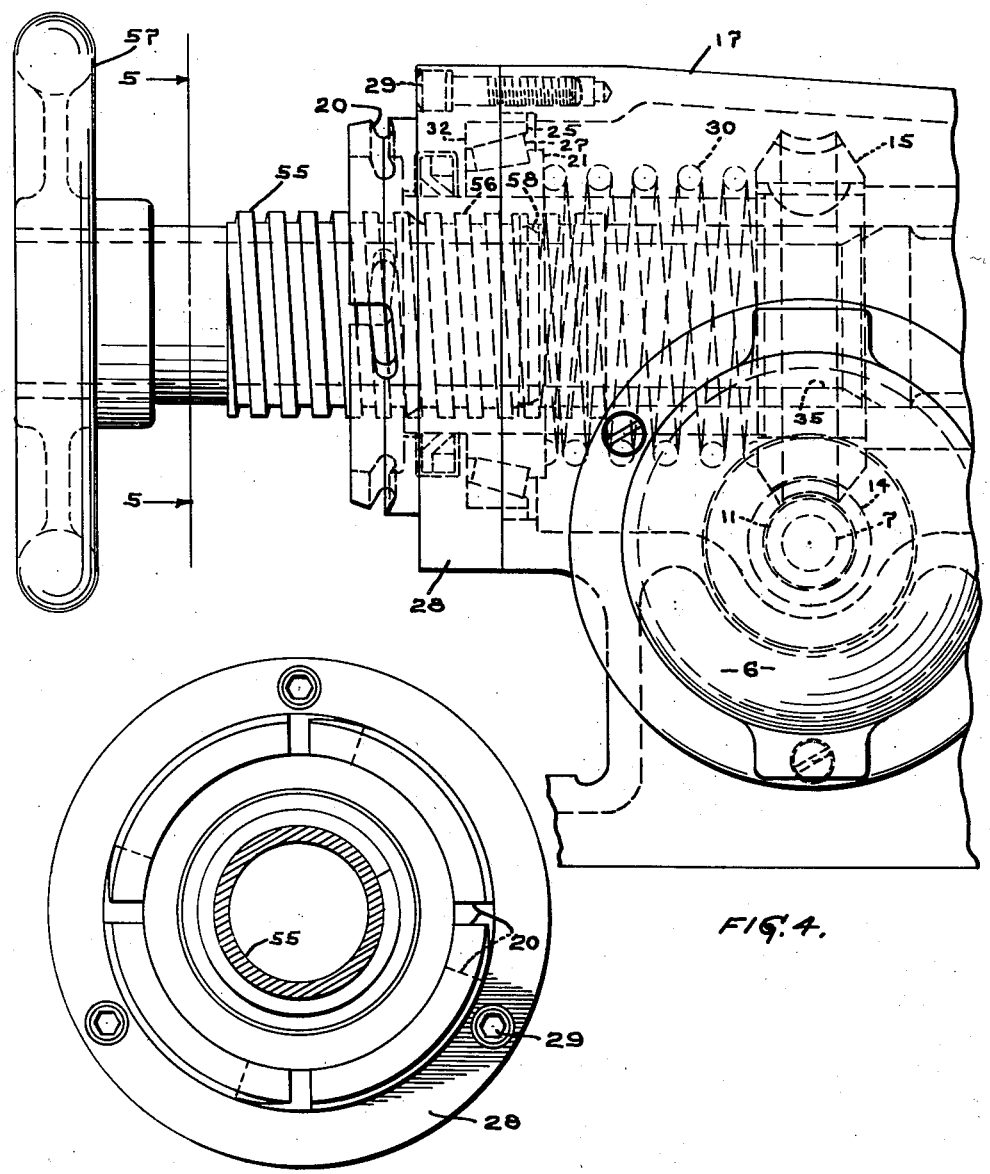
Figure 4 is a longitudinal view of the rear of the chuck showing a hand wheel and screw substituted for the air operating means of the chuck.
Figure 5 is a transverse sectional view on line 5—5 of Figure 4.

When the cap 18 is removed, if desired, a tubular screw 55 may be screwed into threads 56 on the inside of spindle 16 by means of hand wheel 57 and then by hand the collet may be closed, the end 58 of shaft 55 contacting the rear end of the collet sleeve 35 as shown in Figure 4. By this arrangement the air chuck may be transformed to a hand operated chuck by simply removing a cap and inserting the tubular screw 55.

The operation of the chuck will be readily understood from the above detailed description and it will be apparent that many variations may be made without departing from the invention, the scope of which is defined in the following claims.

What is claimed as new and is desired to be secured by Letters Patent is:

1. A quick acting chuck comprising a supporting housing having an axial opening therethrough, a driven spindle in the forward portion of said opening, gripping means in said spindle actuated to closing position by longitudinal movement relatively to said spindle, means rotating with said spindle to move the gripping means to closing position, a non-rotary longitudinally movable piston in the rear end of said housing, the piston having a central circular opening axially in line with the spindle, a non-rotary axial tubular stem sliding closely in the axial opening in the rear of the housing, the stem closing the rear end of the housing opening circumferentially of the stem, and being rigidly connected at its forward end to the piston at the piston central opening, the rear of the housing, the tubular stem and the piston forming an air chamber, the piston being connected to said rotating means to allow for the relative rotation thereof and to move the same to close the gripping means, the rear of the housing having a valve therein for the introduction of air pressure to said chamber.

2. A quick acting chuck comprising a supporting housing having a forward end and a rear end, means to rigidly connect the ends together peripherally of the housing, a tubular spindle rotating in said housing, driving means connected to said spindle to rotate the spindle, rod gripping means in the forward end of said spindle actuated to closing position by longitudinal movement relative to said spindle, the rear end of the housing having rigidly joined peripheral and rear end closing portions and comprising an air chamber, the end closing portion having an opening extending longitudinally in line with the spindle axis forming a stem mounting, a tubular stem sliding longitudinally closely in said opening to close the air chamber at the rear, peripherally of the stem, a piston longitudinally slidable in said chamber and having a central circular opening, axially in line with the spindle, mounted fixedly axially at its central opening, on the forward end of said stem, means to admit air pressure to said chamber to slide the piston, spring means to return the piston upon release of the air pressure, connections between the piston and the gripping means to move the gripping means to closing position, the air pressure effecting said movement through said connections.

3. A quick acting chuck comprising a housing having a forward end and a rear end, means to rigidly connect the ends together peripherally of the housing, forward and intermediate housing bearing rings in the forward end, a spindle in said housing, bearing rings on the spindle rotating in said housing bearing rings, driving means connected to said spindle intermediate said spindle rings, to rotate the spindle, gripping means in said spindle actuated to closing position by longitudinal movement relative to said spindle, the rear end of the housing comprising an air chamber, a piston longitudinally slidable in said chamber, means to admit air pressure to said chamber to slide the piston, spring means to return the piston upon release of the air pressure, the piston having connections thereto to move the gripping means to closing position, the air pressure effecting said movement through said connections.

4. A quick acting chuck comprising a housing having a forward end and a rear end, means to rigidly connect the ends together peripherally of the housing, forward and intermediate housing bearing rings in the forward end, a spindle in said housing, bearing rings on the spindle rotating in said housing bearing rings, driving means connected to said spindle intermediate said spindle rings, to rotate the spindle, gripping means in said spindle actuated to closing position by longitudinal movement relative to said spindle, the rear end of the housing comprising an air chamber, the housing having in its outer rear end an opening, a piston longitudinally slidable in said chamber and having an axial tubular stem sliding closely in said opening, means to admit air pressure to said chamber to slide the piston, spring means to return the piston upon release of the air pressure, connections between the piston and the gripping means to move the gripping means to closing position, the air pressure effecting said movement through said connections.

5. A quick acting chuck comprising a supporting housing having a forward end and a rear end, a spindle rotating in said housing, driving means connected to said spindle to rotate the spindle, gripping means in said spindle actuated to closing position by longitudinal movement relative to said spindle, the rear end of the housing having rigidly joined peripheral and rear end closing portions and comprising a chamber, the end closing portion having an opening extending longitudinally in line with the spindle axis forming a stem mounting, a tubular stem sliding longitudinally closely in said opening to close the air chamber at the rear, peripherally of the stem, a piston longitudinally slidable in said chamber and having a central circular opening, axially in line with the spindle, mounted fixedly axially at its central opening, on the forward end of said stem, means to admit air pressure to said chamber to slide the piston forwardly, a tubular plunger relatively rotatably connected to said piston and extending into said spindle and upon its forward movement, moving the gripping means to closing position, spring means on said plunger, urging the plunger and piston to the rear upon the release of the air pressure to allow for the opening of the gripping means.

6. A quick acting chuck comprising a housing having a forward end and a rear end, means to rigidly connect the ends together peripherally of the housing, forward and intermediate housing bearing rings in the forward end, a spindle in said housing, bearing rings on the spindle rotating in said housing bearing rings, driving means connected to said spindle intermediate said spindle rings, to rotate the spindle, gripping means in said spindle actuated to closing position by longituidinal movement relative to said spindle, the rear end of the housing comprising a chamber, a piston longitudinally slidable in said chamber, means to admit air pressure to said chamber to slide the piston forwardly, a tubular plunger relatively rotatably connected to said piston and extending into said spindle and upon its forward movement, moving the gripping means to closing position, spring means on said plunger, urging the plunger and piston to the rear upon the release of the air pressure to allow for the opening of the gripping means.

7. A quick acting chuck comprising a housing having a forward end and a rear end, means to rigidly connect the ends together pehipherally of the housing, forward and intermediate housing bearing rings in the forward end, a spindle in said housing, bearing rings on the spindle rotating in said housing bearing rings, driving means connected to said spindle intermediate said spindle rings, to rotate the spindle, gripping means in said spindle actuated to closing position by longitudinal movement relative to said spindle, the rear end of the housing having rigidly joined peripheral and rear end closing portions and comprising a chamber, the housing having in its outer rear end an opening extending longitudinally in line with the spindle axis forming a stem mounting, a piston longitudinally slidable in said chamber and having a central circular opening axially in line with the spindle and having rigidly connected to the central opening an axial tubular stem sliding closely in said housing rear end opening, means to admit air pressure to said chamber to slide the piston forwardly, a tubular plunger relatively rotatably connected to said piston and extending into said spindle and upon its forward movement, moving the gripping means to closing position, spring means on said plunger, urging the plunger and piston to the rear upon the release of the air pressure to allow for the opening of the gripping means.

8. A chuck comprising a spindle supporting housing, forward and intermediate bearing rings in said housing, a spindle in said housing, two bearing rings on the spindle, one being slidable thereon and the other fixed, rotating in said housing bearing rings, all said rings being conical, driving means connected to said spindle intermediate said spindle rings, to rotate the spindle, resilient means to hold the slidable spindle ring in operative position with its adjacent housing ring, and to urge the spindle lengthwise to hold the fixed spindle ring and its adjacent housing ring in bearing cooperation, gripping means in said spindle actuated to closing position by longitudinal movement relative to said spindle, and means to move the gripping means longitudinally.

9. A chuck comprising a spindle supporting housing, forward and intermediate bearing rings in said housing, a spindle in said housing, bearing rings on the spindle positioned to cooperate with said housing bearing rings to rotatably support the spindle, one of said spindle rings being longitudinally slidable upon the spindle, resilient means to hold the latter ring in bearing relation to its adjacent housing bearing ring, the surfaces of both sets of rings being conically inclined to center the spindle under the action of said resilient means, means to rotate said spindle connected to the spindle intermediate the spindle bearing rings, gripping means in said spindle actuated to closing position by relative longitudinal movement of the gripping means and spindle, and means to produce said movement.

10. A chuck comprising a spindle supporting housing, forward and intermediate bearing rings in said housing, a spindle in said housing, bearing rings on the spindle positioned to cooperate with said housing rings to rotatably support the spindle, one of said spindle rings being longitudinally slidable on the spindle and the other fixed longitudinally, resilient means acting between said spindle rings to hold said rings in bearing relation to their adjacent housing rings, the bearing surfaces or adjacent bearing rings being conically inclined in opposite directions, means in the housing to hold the housing bearing rings against longitudinal movement in the direction of their conical thrust, said spring and bearing rings axially centering the spindle and holding the spindle against longitudinal movement in the housing, means to rotate said spindle, gripping means in said spindle actuated to closing position by relative longitudinal movement of the gripping means and spindle, and means to produce said movement.

11. A chuck comprising a spindle supporting housing, forward and intermediate bearing rings in said housing, a spindle in said housing, bearing rings on the spindle positioned to cooperate with said housing rings to rotatably support the spindle, one of said spindle rings being fixed and the other longitudinally slidable on the spindle, a spring surrounding the spindle, between the spindle rings, urging the movable ring outwardly, to hold it in bearing relation to its adjacent housing bearing ring, the bearing surface of adjacent rings being conically inclined in opposite directions and axially centering the spindle therebetween, means intermediate said spindle rings to rotate the spindle, gripping means in said spindle actuated to closing position by relative longitudinal movement of the gripping means and spindle, and means to produce said movement.

HENRY C. PRESTON.

REFERENCES CITED

The following references are of record in the file of this patent:

UNITED STATES PATENTS

| Number | Name | Date |
|---|---|---|
| 728,458 | Hanson | May 19, 1903 |
| 926,761 | Oliver | July 6, 1909 |
| 1,946,439 | Heller | Feb. 6, 1934 |
| 1,968,700 | Milotta | July 31, 1934 |
| 2,279,730 | Bradley | Apr. 14, 1942 |
| 2,387,105 | Yager | Oct. 16, 1945 |
| 2,413,678 | Beverlin | Jan. 7, 1947 |
| 2,455,586 | Kooima | Dec. 7, 1948 |
| 2,462,155 | Benjamin et al. | Feb. 22, 1949 |